US012682547B2

(12) United States Patent
Hasan et al.

(10) Patent No.: US 12,682,547 B2
(45) Date of Patent: Jul. 14, 2026

(54) 3D MODEL RENDERING USING IMPORTANCE SAMPLING

(71) Applicant: ADOBE INC., San Jose, CA (US)

(72) Inventors: Milos Hasan, Lafayette, CA (US); Iliyan Georgiev, London (GB); Sai Bi, San Jose, CA (US); Julien Philip, London (GB); Kalyan K. Sunkavalli, Saratoga, CA (US); Xin Sun, Palo Alto, CA (US); Fujun Luan, Sunnyvale, CA (US); Kevin James Blackburn-Matzen, Seattle, WA (US); Zexiang Xu, San Jose, CA (US); Kai Zhang, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 147 days.

(21) Appl. No.: 18/499,673

(22) Filed: Nov. 1, 2023

(65) Prior Publication Data

US 2025/0139883 A1 May 1, 2025

(51) Int. Cl.
 G06T 15/06 (2011.01)
 G06T 7/90 (2017.01)
 G06T 17/00 (2006.01)
(52) U.S. Cl.
 CPC ............... G06T 15/06 (2013.01); G06T 7/90 (2017.01); G06T 17/00 (2013.01); *G06T 2207/10024* (2013.01)
(58) Field of Classification Search
 None
 See application file for complete search history.

(56) References Cited

U.S. PATENT DOCUMENTS

2023/0066636 A1* 3/2023 Morrical ................. G06T 15/04
2024/0046563 A1* 2/2024 Carlson .................. G06N 3/084

OTHER PUBLICATIONS

Ruilong Li, Hang Gao, Matthew Tancik, Angjoo Kanazawa, "NerfAcc: Efficient Sampling Accelerates NeRFs", May 8, 2023, arXiv.org, arXiv:2305.04966v1.*
Mark Colbert, Simon Premoze, Guillaume Francois, "Importance Sampling for Production Rendering", 2010, ACM, SIGGRAPH 2010 Course.*
Nikita Morozov, Denis Rakitin, Oleg Desheulin, Dmitry Vetrov, Kirill Struminsky, "Differentiable Rendering with Reparameterized Volume Sampling", May 10, 2023, arXiv.org, arXiv:2302.10970v2.*

(Continued)

*Primary Examiner* — Robert Bader
(74) *Attorney, Agent, or Firm* — F. CHAU & ASSOCIATES, LLC

(57) ABSTRACT

Embodiments are configured to render 3D models using an importance sampling method. First, embodiments obtain a 3D model including a plurality of density values corresponding to a plurality of locations in a 3D space, respectively. Embodiments then sample the color information from within a random subset of the plurality of locations using a probability distribution based on the plurality of density values. Embodiments have a higher probability to sample each location within the random subset of locations if the location has a higher density probability. Embodiments then an image depicting a view of the 3D model based on the sampling within the random subset of the plurality of locations.

20 Claims, 8 Drawing Sheets

Uniform Sampling

Importance Sampling

(56)　　　　　　　References Cited

OTHER PUBLICATIONS

Arandjelovic, et al., "NeRF in detail: Learning to sample for view synthesis", arXiv preprint arXiv:2106.05264v1 [cs.CV] Jun. 9, 2021, 22 pages.

Chen, et al., "TensoRF: Tensorial Radiance Fields", arXiv preprint arXiv:2203.09517v2 [cs.CV] Nov. 29, 2022, 33 pages.

Hedman, et al., "Baking Neural Radiance Fields for Real-Time View Synthesis", arXiv preprint arXiv:2103.14645v1 [cs.CV] Mar. 26, 2021, 15 pages.

Karnewar, et al., "ReLU Fields: The Little Non-linearity That Could", arXiv preprint arXiv:2205.10824v2 [cs.CV] Jul. 3, 2023, 8 pages.

Kurz, et al., "AdaNeRF: Adaptive Sampling for Real-time Rendering of Neural Radiance Fields", arXiv:2207.10312v2 [cs.CV] Jul. 28, 2022, 17 pages.

Kutz, et al., "Spectral and Decomposition Tracking for Rendering Heterogeneous Volumes", ACM Transactions on Graphics, vol. 36, No. 4, Article 111, Jul. 2017.

Mildenhall, et al., "NeRF: Representing Scenes as Neural Radiance Fields for View Synthesis", arXiv preprint arXiv:2003.08934v2 [cs.CV] Aug. 3, 2020, 25 pages.

Sun, et al., "Direct Voxel Grid Optimization: Super-fast Convergence for Radiance Fields Reconstruction", arXiv preprint arXiv:2111.11215v2 [cs.CV] Jun. 3, 2022, 25 pages.

Woodcock, et al., "Techniques Used in the Gem Code for Monte Carlo Neutronics Calculations in Reactors and Other Systems of Complex Geometry", Paper presented by E.R. Woodcock, pp. 557-579, 1965.

* cited by examiner

Cached tensor(s)

Samples per pixel-ray: 5
Signal-noise: 342.dB
48.64fps

305

Uniform Sampling

Importance Sampling

Figure 6:
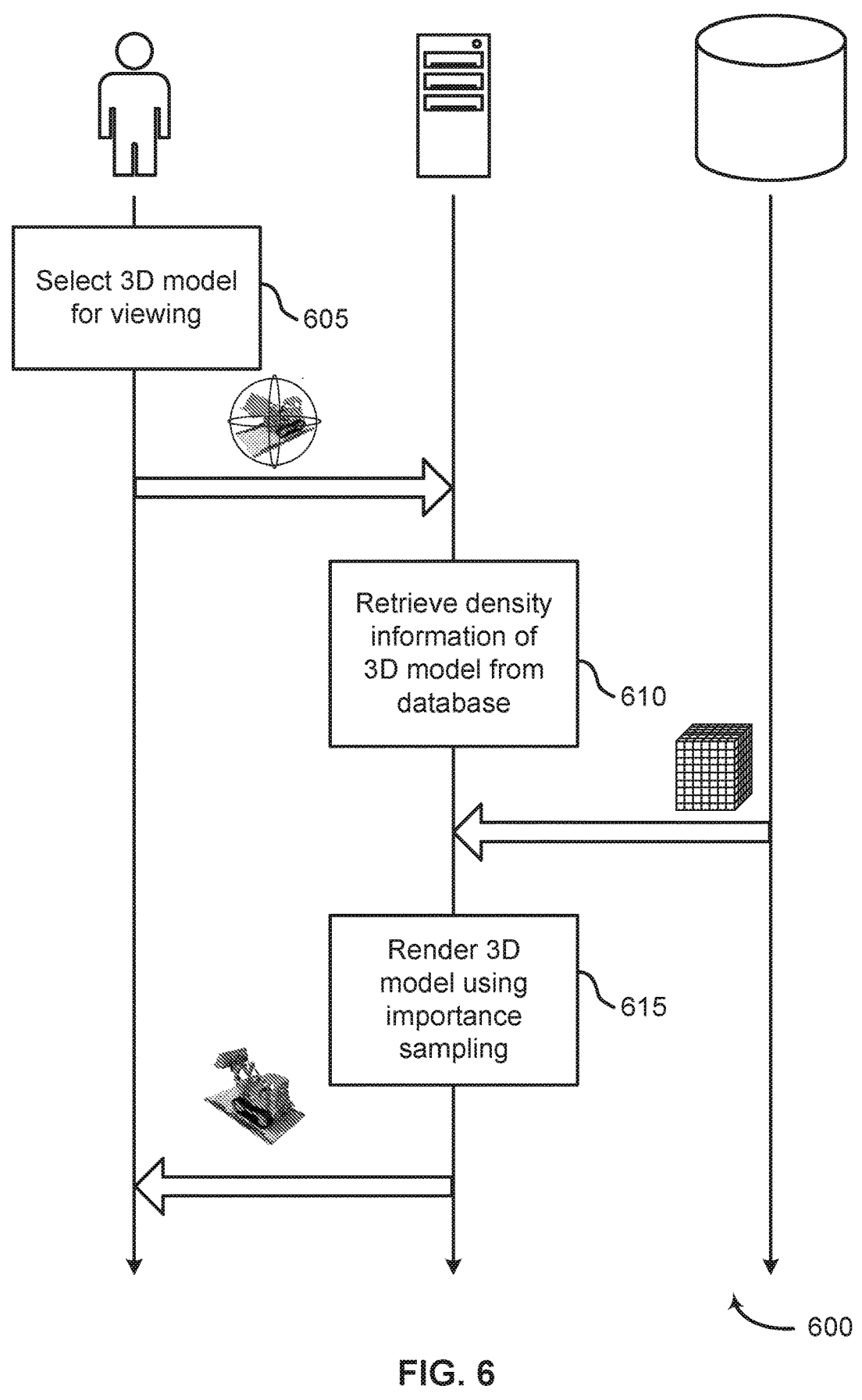

Select 3D model for viewing — 605

Retrieve density information of 3D model from database — 610

Render 3D model using importance sampling — 615

Figure 8:
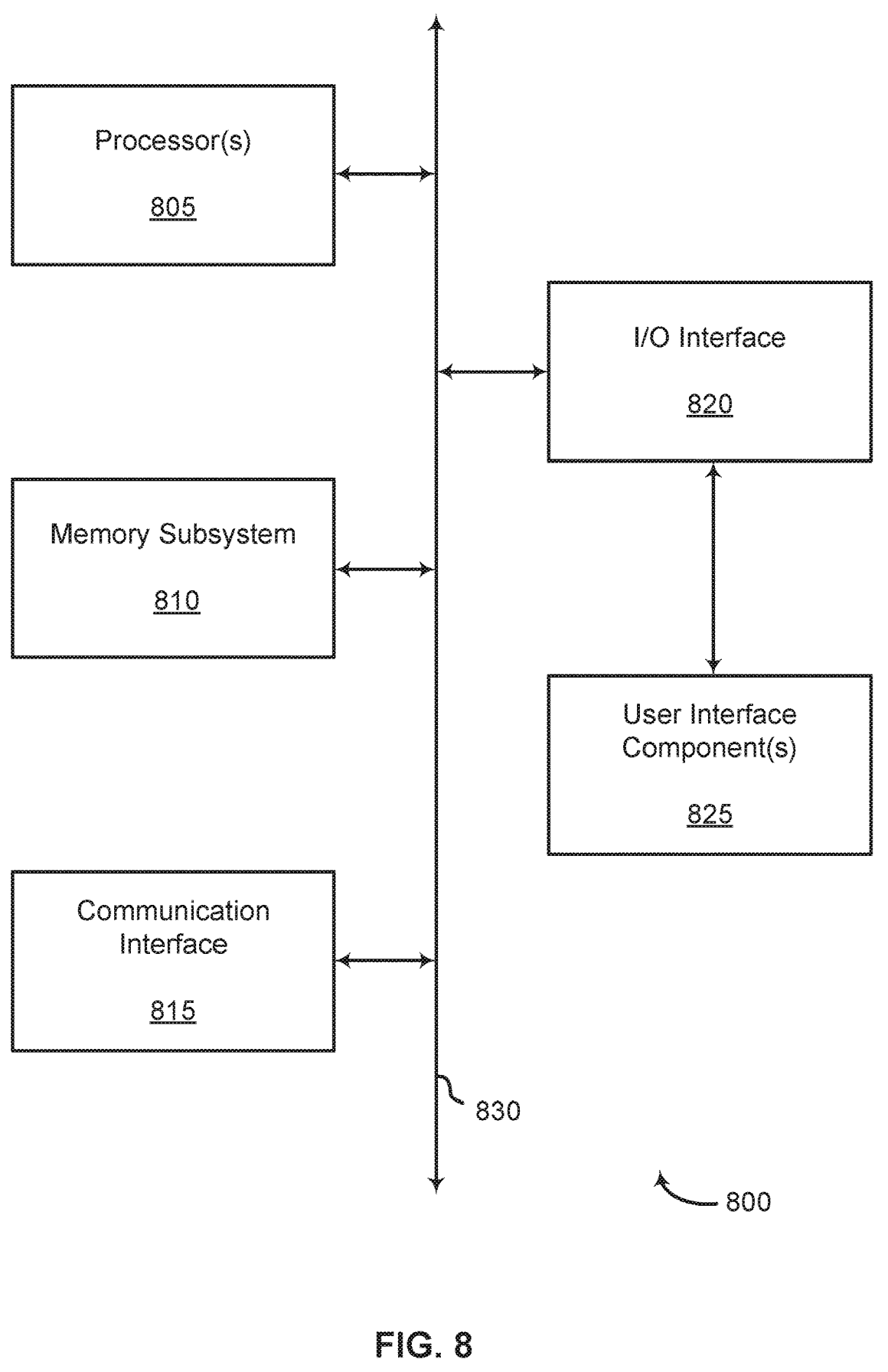

Processor(s)

805

I/O Interface

820

Memory Subsystem

810

User Interface
Component(s)

825

Communication
Interface

3D MODEL RENDERING USING IMPORTANCE SAMPLING

BACKGROUND

The following relates generally to image processing, and more specifically to rendering images of 3D models. Image processing and computer vision focus on how machines can understand, interpret, and interact with visual data. Image processing algorithms range from simple tasks such as image enhancement and noise reduction, to more complex tasks such as object detection, face recognition, semantic segmentation, and image content generation. Image processing forms the foundation for computer vision, enabling machines to mimic human visual perception and interpret the world in a structured and meaningful way.

Image processing techniques include rendering three-dimensional (3D) models. Image rendering is a process that enables the visualization of 3D models on two-dimensional (2D) displays. This procedure involves generating a series of images that are created by computing the visual properties at various spatial locations within a scene. Rendering systems can process a range of shape data representations such as meshes and voxels. Rendering methods include vertex processing, ray tracing, and rasterization to interpret and handle these data structures. Additionally, 3D models may be represented by functions in the form of neural networks (NN) that decode the volumetric attributes of a scene into visual outputs, facilitating the visualization of 3D environments and objects in a structured manner.

SUMMARY

Systems and methods for 3D model rendering are described. Embodiments include a density sampling component configured to sample a plurality of densities (i.e., "density information") corresponding to a plurality of locations, respectively. The density information for a 3D model can be pre-computed and stored as a discretized voxel gird or factorized component tensors. A rendering component simulates a ray from a view location through the 3D model for each pixel of an output image. A color sampling component samples color information along points of the ray according to an importance sampling method. According to some aspects, the importance sampling method includes choosing a plurality of random locations along the ray, and then sampling the color information at each location based on the density probability at the location. In some embodiments, a location that has a higher density probability is more likely to be sampled. Accordingly, embodiments can compute a representative color for each pixel using a small number of samples, enabling the real-time rendering of 3D models.

A method, apparatus, non-transitory computer readable medium, and system for rendering images of 3D models are described. One or more aspects of the method, apparatus, non-transitory computer readable medium, and system include obtaining a 3D model including a plurality of density values corresponding to a plurality of locations in a 3D space, respectively; sampling a random subset of the plurality of locations using a probability distribution based on the plurality of density values; and rendering an image depicting a view of the 3D model based on the random subset of the plurality of locations.

A non-transitory computer-readable medium is described, which includes instructions executable by a processor to render images of 3D models. One or more aspects of the non-transitory computer-readable medium include obtaining a 3D model including a plurality of density values corresponding to a plurality of locations in a 3D space, respectively; sampling a random subset of the plurality of locations using a probability distribution based on the plurality of density values; and rendering an image depicting a view of the 3D model based on the random subset of the plurality of locations.

An apparatus, system, and method for rendering images of 3D models are described. One or more aspects of the apparatus, system, and method include at least one processor; at least one memory including instructions executable by the at least one processor; a color sampling component configured to sample a random subset of a plurality of locations using a probability distribution based on a plurality of density values, wherein the plurality of density values correspond to a plurality of locations in a 3D space, respectively; and a rendering component configured to render an image depicting a view of a 3D model based on the random subset of the plurality of locations.

BRIEF DESCRIPTION OF THE DRAWINGS

FIG. 6 shows an example of a method for rendering a 3D model in real time to a user according to aspects of the present disclosure.

FIG. 8 shows an example of a computing device according to aspects of the present disclosure.

DETAILED DESCRIPTION

Figure 1:
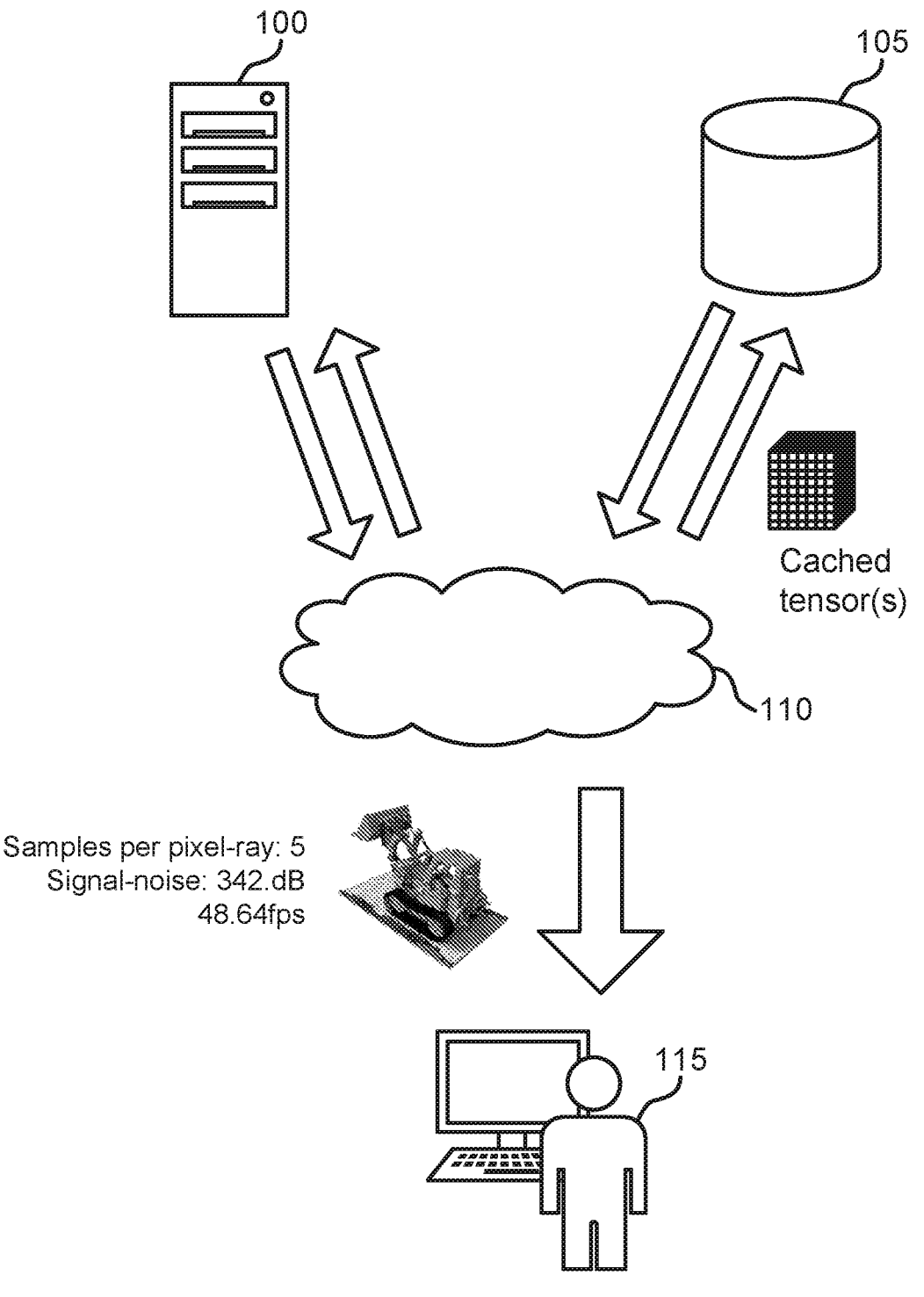
FIG. 1 shows an example of a 3D rendering system according to aspects of the present disclosure.

In the realm of computer graphics and visualization, three-dimensional (3D) models are structured representations that encapsulate the physical attributes of objects or environments in a virtual space. These 3D models can be formed using various data representations including meshes, which are networks of vertices, edges, and faces that define the shape of the 3D object, and voxels, a volumetric element representing values on a regular grid in three-dimensional space. Additionally, the models can be represented through functions such as multilayer perceptrons (MLPs), a type of neural network (NN), and which serve to define relationships and properties within the 3D space in a mathematical manner.

The visualization of these 3D models on two-dimensional (2D) displays is facilitated through the process of image rendering. This involves generating a series of images, each formulated by computing the visual attributes at different spatial locations within the scene being depicted. To handle and interpret the data structures embodied by 3D models, rendering systems employ a variety of techniques. Vertex processing, for instance, manages the individual vertices making up the 3D mesh structures. Ray tracing is another method that simulates the way rays of light interact with objects to generate images. Meanwhile, rasterization converts vector graphics into raster graphics, which comprise pixels, and which enable the depiction of 3D models on 2D displays. In the context of MLP representations, the generation of color information is conducted by sampling the function at points in the 3D space, which can then be aggregated to compute color values for pixels. The sampling includes inputting the 3D coordinates, view location, and view direction to the MLP, which outputs the color (sometimes referred to as "radiance") and density information.

Conventional sampling methods for the MLP representations include casting pixel-rays from a view location through 3D space, and then sampling the color information and density information at regular intervals in the locations spanned by the array. However, sampling at regular intervals can result in hundreds of samples per pixel ray, which is a large computational overhead. This can result in requiring several seconds to create an image, which does not allow for real-time camera adjustments in viewing a 3D model.

Some techniques for reducing the computational overhead for rendering MLP representations include changing the underlying function, e.g., by factorizing the MLP into multiple components. Other techniques attempt to reduce the number samples by setting thresholds, such as ceasing sampling operations once an aggregate threshold density is predicted. Another technique is to utilize two MLPs representing course and fine resolutions, and to sample the color information therefrom. However, these techniques currently still use tens of samples, and do not approach real-time speeds on user devices.

Embodiments of the present disclosure, by contrast, perform an importance sampling method that greatly reduces the number of samples used to produce pixel images. According to some aspects, the importance sampling method includes choosing a plurality of random locations along the ray, and then sampling the color information at each location based on the density probability at the location. In some embodiments, a location that has a higher density probability is more likely to be sampled. Additional detail regarding the importance sampling method is provided with reference to FIG. 4. Using this method, embodiments are capable of reproducing accurate pixel colors in as few as 5 samples per pixel ray. In this way, embodiments improve on 3D model rendering systems by enabling the real-time rendering of 3D models from different views.

A 3D rendering system is described with reference to FIGS. 1-5. Methods for rendering 3D models using importance sampling are described with reference to FIGS. 6-7. A computing device configured to implement a 3D rendering apparatus is described with reference to FIG. 8.

3D Rendering System

An apparatus for rendering images of 3D models is described. One or more aspects of the apparatus include at least one processor; at least one memory including instructions executable by the at least one processor; a color sampling component configured to sample a random subset of a plurality of locations using a probability distribution based on a plurality of density values, wherein the plurality of density values correspond to a plurality of locations in a 3D space, respectively; and a rendering component configured to render an image depicting a view of a 3D model based on the random subset of the plurality of locations.

In some aspects, the color sampling component is further configured to filter the plurality of locations based on the plurality of density values to obtain a plurality of filtered locations, wherein the random subset is sampled from the plurality of filtered locations. The filtering may be computed by the color sampling component on the basis of a density probability distribution.

Some examples of the apparatus, system, and method further include a density sampling component configured to obtain the plurality of density values. In some aspects, the density sampling component is further configured to store the plurality of density values as a discretized density grid.

In some aspects, the rendering component is further configured to identify color information for each location in the random subset, wherein the image is rendered based on the color information. In some aspects, the rendering component is further configured to combine the color information for each location in the random subset to obtain a pixel color for a pixel of the image, wherein the image is rendered based on the pixel color.

FIG. 1 shows an example of a 3D rendering system according to aspects of the present disclosure. The example shown includes 3D rendering apparatus 100, database 105, network 110, and user interface 115.

In an example process, a user selects a 3D model for viewing via user interface 115. 3D rendering apparatus 100 then fetches the 3D model from database 105, which may be represented as a function in the form of a multilayer perceptron (MLP). In some embodiments, 3D rendering apparatus 100 further obtains density information for the 3D model, which can be saved as one or more cached tensor(s). Then, 3D rendering apparatus 100 displays a render of the 3D model to the user via user interface 115. According to some aspects, by using importance sampling methods, the 3D rendering apparatus 100 is able to present a new rendered image to the user at around 30 frames per second or higher, enabling the user to interact with the 3D model by adjusting a simulated camera in real-time.

According to some aspects, 3D rendering apparatus 100 obtains a 3D model including a set of density values corresponding to a set of locations in a 3D space, respectively. In some aspects, the 3D model includes a Neural Radiance Field (NeRF) model. The 3D model may be represented by a function in the form of an MLP, and the density values may be obtained by inputting different locations into the MLP in a pre-processing step. 3D rendering apparatus 100 is an example of, or includes aspects of, the corresponding element described with reference to FIG. 2.

Embodiments of the 3D rendering apparatus 100 are implemented on a server. A server provides one or more functions to users linked by way of one or more of the various networks. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Database 105 stores information used by 3D rendering apparatus 100 such as MLP representations of 3D scenes objects, cached density information of the 3D objects, shape data, images, configuration settings, and the like. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with a database controller. In other cases, a database controller may operate automatically without user interaction.

Network 110 facilitates the transfer of information between 3D rendering apparatus 100, database 105 and a user, e.g., via user interface 115. Network 110 may be referred to as a "cloud". A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

User interface 115 enables a user to interact with the 3D rendering system. In some embodiments, the user interface 115 includes an audio device, such as an external speaker system, an external display device such as a display screen, or an input device (e.g., remote control device interfaced with the user interface 115 directly or through an IO controller module). In some cases, a user interface 115 includes a graphical user interface (GUI).

Figure 2:
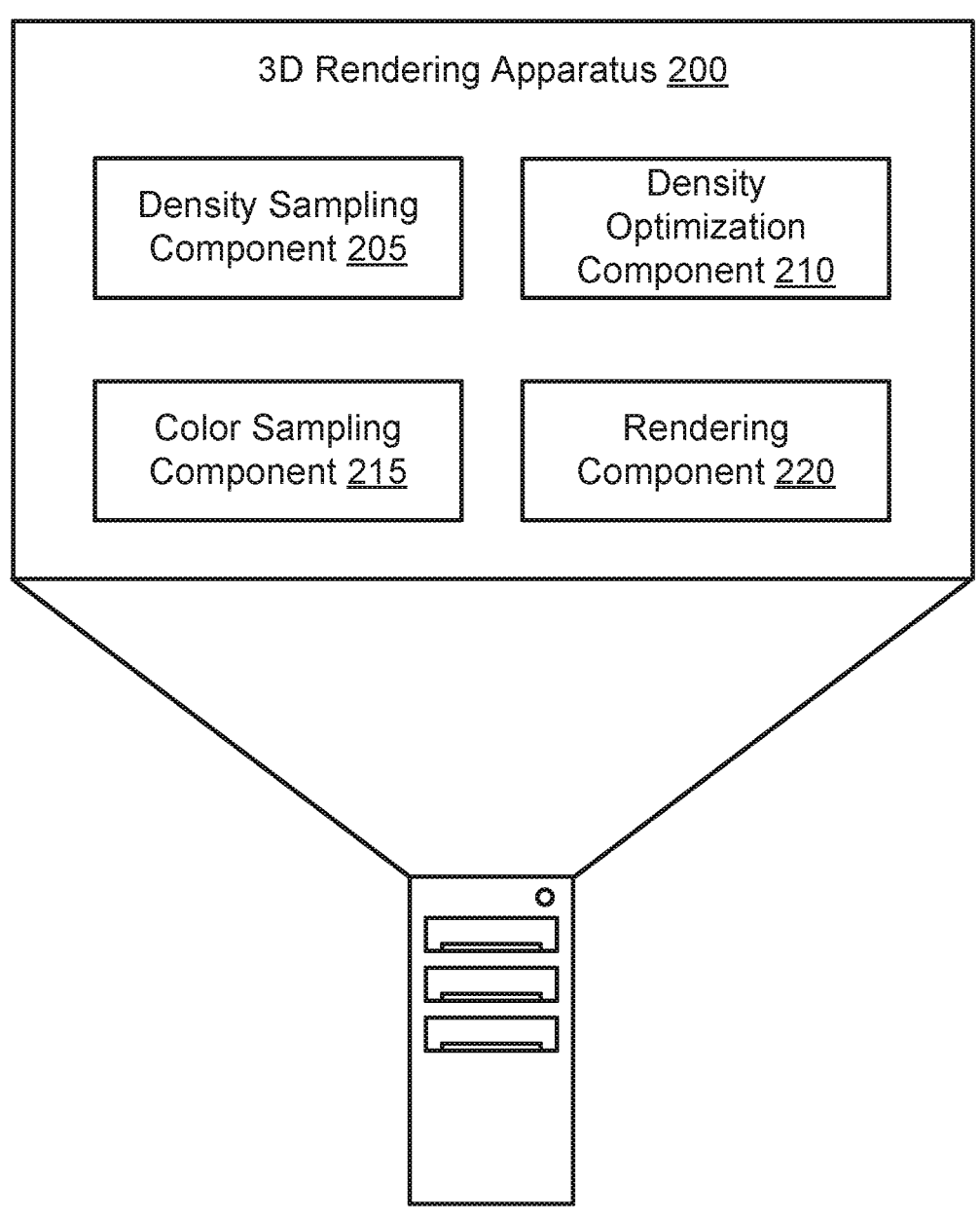
FIG. 2 shows an example of a 3D rendering apparatus according to aspects of the present disclosure.

FIG. 2 shows an example of a 3D rendering apparatus 200 according to aspects of the present disclosure. The example shown includes 3D rendering apparatus 200, density sampling component 205, density optimization component 210, color sampling component 215, and rendering component 220. 3D rendering apparatus 200 is an example of, or includes aspects of, the corresponding element described with reference to FIG. 1.

Embodiments of 3D rendering apparatus 200 include several components and sub-components. These components are variously named and are described so as to partition the functionality enabled by the processor(s) and the executable instructions included in the computing device used in design generation apparatus 200 (such as the computing device described with reference to FIG. 8). In some examples, the partitions are implemented physically, such as through the use of separate circuits or processors for each component. In some examples, the partitions are implemented logically via the architecture of the code executable by the processors.

3D models can be represented as meshes, which define surfaces of a shape and comprise vertices. They can also be represented as voxels, which are cubic atomic elements placed within a 3D space. 3D models can be further represented as a continuous or discretized function that outputs color and density information for a given position and view in 3D space. These functions may be formed as an artificial neural network (ANN) structure, as such a structure enables the creation and optimization of the 3D model from images. An ANN includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times. A 3D model representation may be initialized and trained using a few images of a scene. In some embodiments, the 3D model representation is a Neural Radiance Field (NeRF) representation, which includes a multilayer perceptron (MLP) neural network.

An MLP is a feed forward neural network that typically includes multiple layers of perceptrons. Each component perceptron layer may include an input layer, one or more hidden layers, and an output layer. Each node may include a nonlinear activation function. An MLP may be trained using backpropagation (i.e., computing the gradient of the loss function with respect to the parameters).

Density sampling component 205 is configured to compute a predicted density of a 3D object at a given point in 3D space using the MLP representation of an object. A density refers to the volume density at a particular point in the 3D space, which is denoted by the symbol σ. The density indicates how much substance or material is present at that point, and it significantly influences the appearance of the rendered image, particularly in terms of opacity and the amount of light absorbed or scattered at that point. In some cases, density is sampled during a ray marching process while rendering an image. Some embodiments, in contrast, sample the density of the entire 3D scene (e.g., at a configurable spacing interval), to create a discretized voxel grid of densities. In some cases, the sampled density value depends only on the 3D position in space, and not the view direction, thereby enabling density information for a 3D model to be saved for use in rendering any view. The density information is used in the importance sampling method, which will be described in greater detail with reference to FIG. 4. In some aspects, the set of density values are represented as a set of factorized component tensors, which is an alternative to the discretized voxel grid. For example, the density at a given position in 3D space may be determined by one or more combinations (e.g., dot product) of the component tensors. Density sampling component 205 is an example of, or includes aspects of, the corresponding element described with reference to FIG. 5.

Density optimization component 210 optimizes the saved density information. For example, when the densities throughout the 3D space are sampled to form a discrete grid, sharp discontinuities between each point might not be accurately represented. Accordingly, the density optimization component 210 optimizes a 3D grid of densities DG to minimize the following objective:

$$\text{loss} = \sum (\log(1 + \sigma_{xi}) - \text{Trilinear } (SD_G, xi))^2 \tag{1}$$

with $$SD_G = (D_{max} - D_{min})S(D_G) + D_{min} \tag{2}$$

where S(•) denotes a scaling function, and where $\sigma_{xi}$ are samples of the density using the MLP representation at position xi, and Trilinear (D, x) is the trilinear sampling of D at position x. In some embodiments, the grid optimized for 5000 steps using one sample per grid cell and ignoring samples that fall in unoccupied grid cells. According to some aspects, using $SD_G$ enables a more constrained range of parameters, resulting in more efficient quantization. Once the optimized field DG is obtained, the density optimization component 210 computes and $SD_G$ and quantizes it to an 8-bit representation, and also stores $SD_{max}$ of the optimized density grid. When densities are sampled from this optimized density grid at any given position x, the density is therefore given by:

$$\sigma(x) = \max(0, \exp(SD_{max} * \text{Trilinear } (SD_G, x) - 1.0)) \tag{3}$$

Therefore, the exponential is applied after interpolation, which allows for sharper density gradients. In some embodiments, an 8-bit float texture is used to store $SD_G$ which can receive values in the range [0, 1]. Density optimization component 210 is an example of, or includes aspects of, the corresponding element described with reference to FIG. 5.

Color sampling component 215 is configured to obtain color information, sometimes referred to as "radiance", of a 3D object based on a position and a view direction. According to some aspects, color sampling component 215 computes the color information using the MLP of a 3D model. Color sampling component 215 is an example of, or includes aspects of, the corresponding element described with reference to FIG. 5.

Rendering component 220 performs a ray marching process to identify locations for color sampling by color sampling component 215, and then aggregates the color information and density information along locations of a pixel ray to yield a final color for the corresponding pixel. The number of samples and the locations of the samples are determined according to an importance sampling method, which will be described in detail with reference to FIG. 4. Rendering component 220 performs this process for each pixel used to render an image at a configured resolution. Rendering component 220 is an example of, or includes aspects of, the corresponding element described with reference to FIG. 5.

Figure 3:
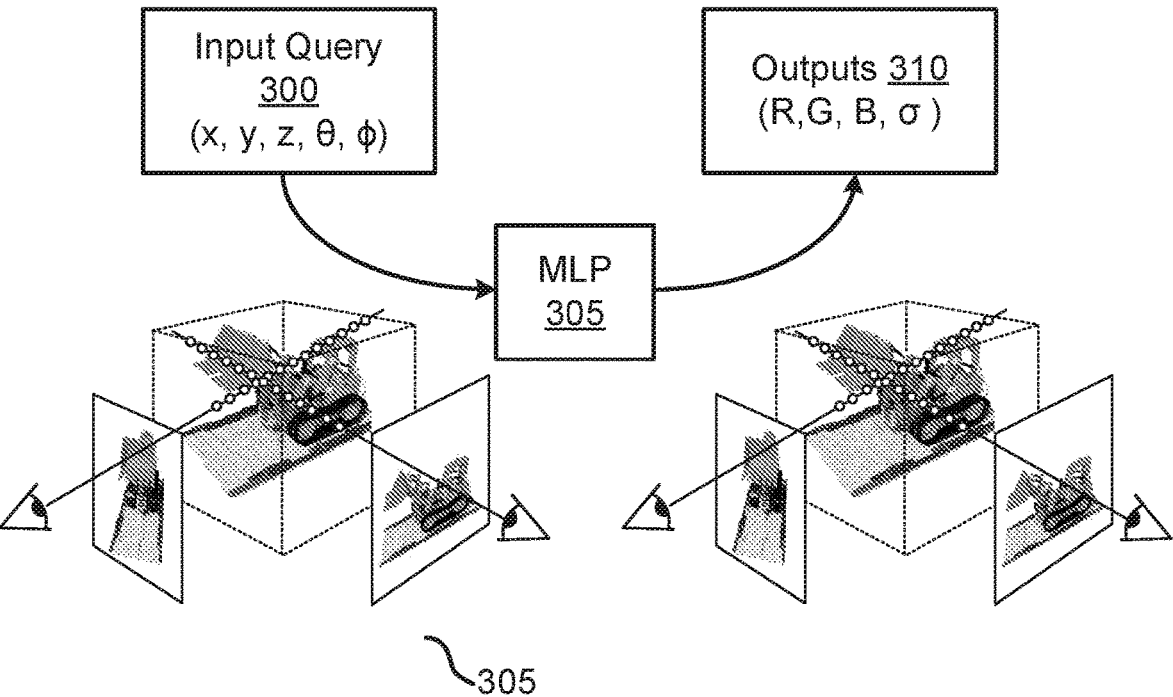
FIG. 3 shows an example of a 3D model representation according to aspects of the present disclosure.

FIG. 3 shows an example of a 3D model representation according to aspects of the present disclosure. The example shown includes input query 300, MLP 305, and outputs 310.

In this example, MLP 305 (e.g., an MLP of a NeRF representation) is configured to produce 4-dimensional outputs 310 comprising color information (R, G, B) and density information σ from a 5-dimensional input comprising a position in 3D space (x, y, z), a view direction in spherical coordinates (θ, φ). To create a 2D image of the object, a rendering component may simulate a ray through the 3D volume, with a view direction defined by a view position and an end point such that the ray passes through the object. Then, the rendering component may sample different locations along the ray, with the coordinates of the locations and the view direction used as input to MLP 305. The color and density information at each point may be aggregated to determine a final pixel color. This process can be repeated for a plurality of rays respectively corresponding to a plurality of pixels to generate an image.

Figure 4:
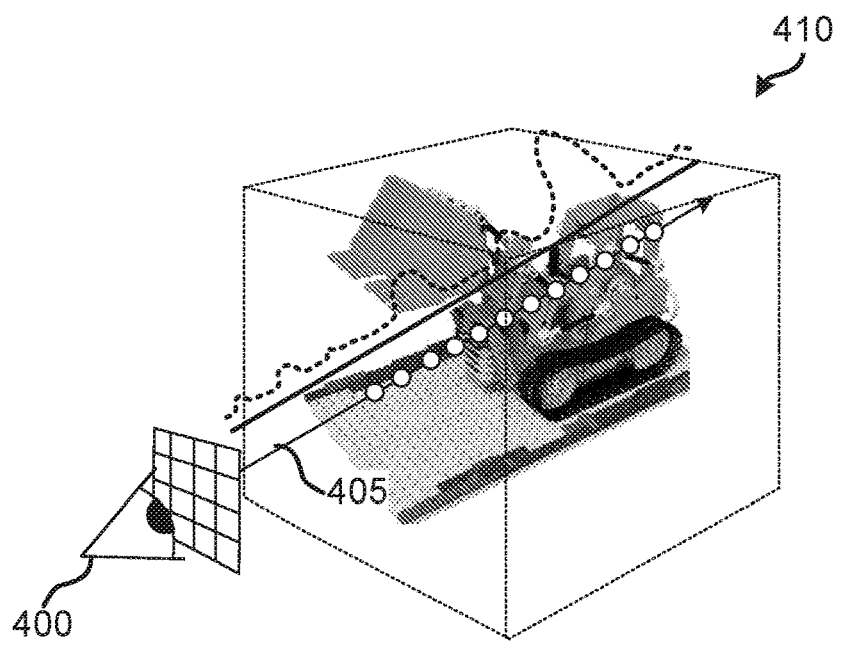
FIG. 4 shows an example of conventional sampling and importance sampling according to aspects of the present disclosure.
Figure 4:
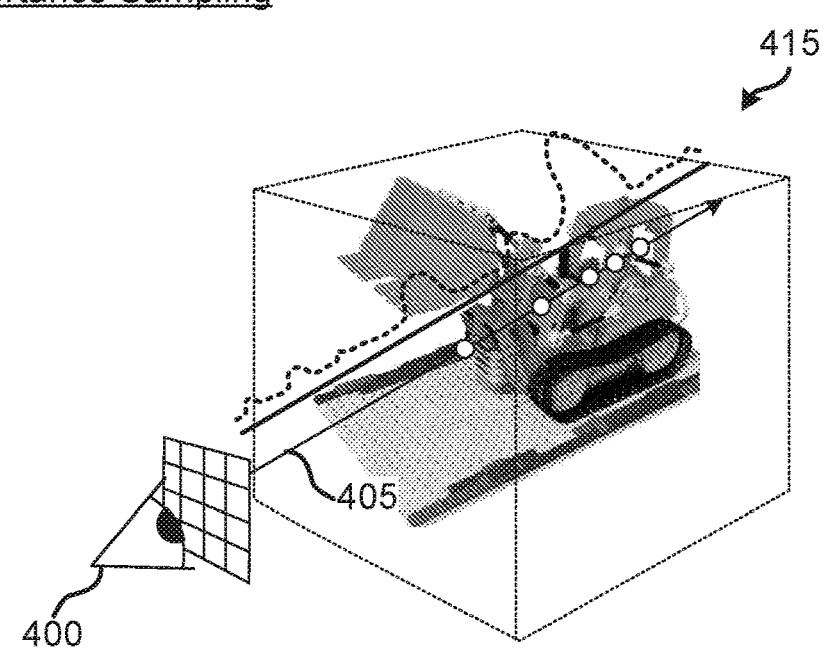

FIG. 4 shows an example of conventional sampling and importance sampling 415 according to aspects of the present disclosure. The example shown includes view position 400, pixel ray 405, uniform sampling 410, and importance sampling 415.

The following describes an example where a 3D model is represented as a NeRF representation, but embodiments are not necessarily limited thereto, and the rendering techniques described herein may be applied to other 3D representations that involve sampling from a field. NeRF encodes a 3D scene as a continuous radiance field function f: (x, d)→(c, σ), where x is a position tensor, d is a direction tensor, and c is a color tensor. A NeRF uses MLPs to model the radiance field f and uses an emission-only volumetric rendering model for radiance computation. The color $\hat{C}(r)$ along camera ray r(t)=o+td (e.g. pixel ray 405) belonging at camera center o (e.g. view position 400) in the direction d can be computed by approximating the volumetric rendering integral via quadrature using the ray marching sum:

$$\hat{C}(r) = \sum_{i=1}^{N} (T_i \cdot a_i) \cdot c_i = \sum_{i=1}^{N} w_i \cdot c_i \tag{4}$$

$$T_i = \prod_{j=1}^{i-1} (1 - \alpha_j), \alpha_i = 1 - \exp(-\sigma_i \delta_i) \tag{5}$$

where $a_i$ is the opacity and indicates the probability that the ray terminates at the point i and $\delta_i = t_{i+1} - t_i$ denotes the distance between neighboring points along the ray. The accumulated transmittance $T_i$ represents the probability that a ray travels up to i without hitting any particle. The transmittance for a ray T(r) is computed as the exponential of the negative integral of the density σ along the ray. Note that this is a discrete ray marching sum, as opposed to a continuous volume rendering integral used in some NeRF models, which is relatively unoptimized.

A NeRF model is developed using a set of training images, which can represent an artificial 3D scene, or something from real-life that was captured via a digital camera. The model is optimized to minimize the mean-squared error (MSE) between per pixel predicted renderings $\hat{C}(r_p)$ corresponding to ground-truth color $C(r_p)$ for all pixels p in the set of training pixels $\mathcal{P}$:

$$\mathcal{L}_{MSE} = \sum_{p \in \mathcal{P}} \left\| \hat{C}(r_p) - C(r_p) \right\|_2^2 \tag{6}$$

Referring again to Equation (4), $w_i = T_i \cdot a_i$ and refers to the weight of the i-th sample along the ray segment which is bounded by the near and far planes of the 3D space encapsulating the 3D object. The sum of the weights, $$W = \Sigma_{i=1}^{N} w_i$$

is the opacity of the ray, (1−Transmittance(ray)).

A conventional rendering process for viewing a 3D model represented as a NeRF includes uniform sampling 410, which samples color information along regular intervals in an array. This can impart a large computational overhead to the rendering process. In importance sampling, the weights $w_i$ can be used to define a probability distribution over the samples: $p_i = w_i/W$. Randomly choosing a sample i from this distribution and returning $c_iW$ is an unbiased estimator for the radiance $\hat{C}(r)$, as shown by Equation (7) and recalling $p_i = w_i/W$:

$$\sum_{i=1}^{N} p_i c_i W = \sum_{i=1}^{N} w_i \cdot c_i = \hat{C}(r) \tag{7}$$

the estimator $c_iW$ can be improved by using more than 1 sample.

As this importance sampling method follows a Monte Carlo estimating scheme, the estimator $c_iW$ can be referred to as a Monte Carlo estimator. The Monte Carlo estimator is efficient, because only a few weights along the ray (typically weights closer to a surface) have high values, and the color information does not have a large variance among the high-weight samples. Accordingly, an estimator $c_iW$ based on as few as 1-5 samples can return accurate color information for constructing a pixel from the ray.

Some embodiments compute the sampling without storing the density probabilities in an array by using two passes over the ray. In the first pass, embodiments compute the opacity W, and in the second pass, embodiments choose a random number in [0, W] and use it to sample i based on the cumulative distribution of the weights. For example, if a $p_i$ from the density distribution indicates a probability for a higher density, then the point is more likely to be sampled for color information. In FIG. 4, for example, the density distribution is represented by the dotted line above the ray, where a higher amplitude indicates a higher predicted density. The two-pass scheme is extended to M>1 samples along the same ray by choosing multiple random numbers in [0, W] and choosing multiple indices in the second pass. Some indices may coincide, in which case the indices will still be counted separately, but their color information is evaluated only once.

Though computing the sampling distribution still requires evaluating the density weights at a dense set of samples N, as described above the density/weight evaluation can be performed in advance and stored as a discretized density grid or factorized component tensors. In some NeRF implementations, the run-time evaluation of density is also cheaper than the evaluation of color information. In either case, computing the sampling distribution uses the relatively inexpensive density information, and the number of samples M computed for importance sampling 415 is much, much fewer than the N samples from uniform sampling 410.

Figure 5:
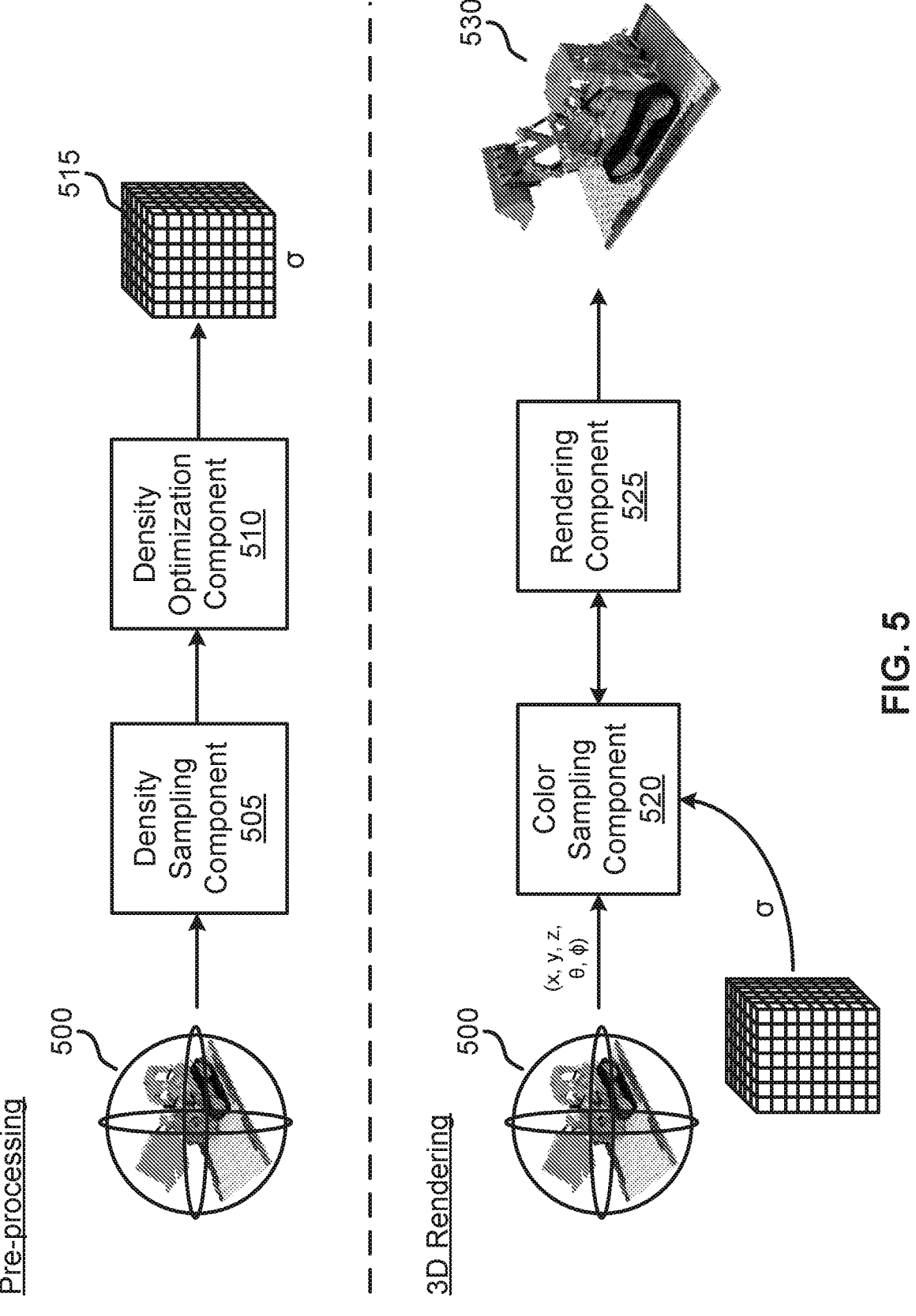
FIG. 5 shows an example of preprocessing and rendering pipelines according to aspects of the present disclosure.

FIG. 5 shows an example of preprocessing and rendering pipelines according to aspects of the present disclosure. The example shown includes 3D model 500, density sampling component 505, density optimization component 510, density information 515, color sampling component 520, rendering component 525, and output image 530. Density sampling component 505, optimization component 510, color sampling component 520, and rendering component 525 are examples of, or include aspects of, the corresponding elements described with reference to FIG. 2.

In an example pre-processing phase, density sampling component 505 receives 3D model 500 and computes the densities for a plurality of locations in the 3D space that contains the 3D scene or object. For example, density sampling component 505 may compute a cube of density values at $512^3$ locations based on a configurable resolution of the density grid. Then, density optimization component 510 optimizes the plurality of density values according to Equations (1) and (2) to produce density information 515. This pre-processing phase may be applied for each 3D model of a set of 3D models in a database, and the density information 515 for each 3D model may be connected to the 3D model in the database.

The 3D rendering process may commence once a user selects the 3D model. A 3D rendering apparatus pulls the 3D model 500 and the density information 515 of the 3D model from a database. Then, rendering component 525 of the 3D rendering apparatus simulates a ray through the 3D space of the 3D model 500 based on a simulated camera. rendering component 525 identifies a plurality of locations along the ray for sampling according to the importance sampling method described above. At each identified location, color sampling component 520 obtains color information by running the radiance function (e.g., an MLP) of the 3D model 500. In some aspects, this also produces the density at the location, which can be used, or the density can be obtained from the cached density information 515. The color information and the density information for the samples are combined to produce a final pixel value, and this ray marching and importance sampling process is repeated for each pixel in output image 530.

Rendering 3D Models

A method for rendering images of 3D models is described. One or more aspects of the method include obtaining a 3D model including a plurality of density values corresponding to a plurality of locations in a 3D space, respectively; sampling a random subset of the plurality of locations using a probability distribution based on the plurality of density values; and rendering an image depicting a view of the 3D model based on the random subset of the plurality of locations.

Some examples of the method, apparatus, non-transitory computer readable medium, and system further include selecting a camera position for the image, wherein the image depicts a view of the 3D model from the camera position. Some examples further include computing a ray through the 3D model from the camera position, wherein the random subset is selected from a set of locations along the ray. Some examples of the method, apparatus, non-transitory computer readable medium, and system further include performing a ray marching operation based on the random subset, wherein the image is rendered based on the ray marching operation.

Some examples of the method, apparatus, non-transitory computer readable medium, and system further include identifying color information for each location in the random subset, wherein the image is rendered based on the color information. Some examples further include combining the color information for each location in the random subset to obtain a pixel color for a pixel of the image, wherein the image is rendered based on the pixel color.

Some examples of the method, apparatus, non-transitory computer readable medium, and system further include computing an opacity value for each of the plurality of locations. Some examples further include generating the probability distribution based on the opacity value. Some examples of the method, apparatus, non-transitory computer readable medium, and system further include filtering the plurality of locations based on the plurality of density values to obtain a plurality of filtered locations, wherein the random subset is sampled from the plurality of filtered locations.

In some aspects, the 3D model comprises a Neural Radiance Field (NeRF) model. In some aspects, the plurality of density values are represented as a discretized density grid. In some aspects, the plurality of density values are represented as a plurality of factorized component tensors.

FIG. 6 shows an example of a method 600 for rendering a 3D model in real time to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user selects a 3D model for viewing. For example, the user may interact with a user interface such as a website or other GUI that includes listings of a plurality of 3D models. The user may select the model they wish to view from the listing. Alternatively, the user may upload their own model for viewing.

At operation 610, the system retrieves the density information of the 3D model from a database. The density information represents the presence of an object from the 3D model at a plurality of locations within a 3D space.

At operation 615, the system renders 3D model using importance sampling. For example, the system may perform ray marching to obtain a plurality of locations from which to sample color information. The plurality of locations may be chosen for sampling based on the density information. According to some aspects, locations that have a higher density probability are more likely to be sampled for color information. Additional detail regarding importance sampling is provided with reference to Equations (4)-(7).

Figure 7:
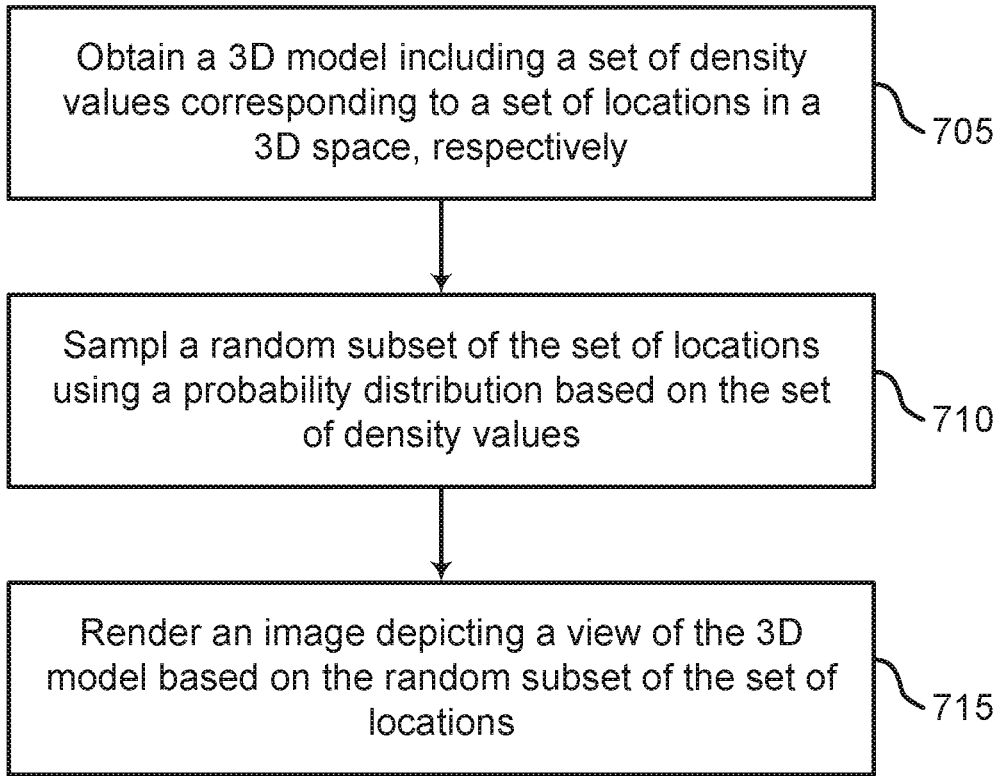
FIG. 7 shows an example of a method for rendering a 3D model according to aspects of the present disclosure.

FIG. 7 shows an example of a method 700 for rendering a 3D model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains a 3D model including a set of density values corresponding to a set of locations in a 3D space, respectively. In some cases, the operations of this step refer to, or may be performed by, a 3D rendering apparatus as described with reference to FIGS. 1 and 2. In some cases, a user provides the 3D model by uploading the 3D model to the 3D rendering apparatus via, e.g., a user interface.

At operation 710, the system samples a random subset of the set of locations using a probability distribution based on the set of density values. In some cases, the operations of this step refer to, or may be performed by, a color sampling component and a rendering component as described with reference to FIGS. 2 and 5. The rendering component may simulate a ray through the 3D space from a camera viewpoint, and sample from a set of locations constrained to the ray. The rendering component may choose from among this ray set according to an importance sampling method, which is described in detail with reference to Equations (4)-(7).

At operation 715, the system renders an image depicting a view of the 3D model based on the random subset of the set of locations. In some cases, the operations of this step refer to, or may be performed by, a rendering component as described with reference to FIGS. 2 and 5. The rendering component may collect color information to generate a pixel color based on sampling from each ray.

FIG. 8 shows an example of a computing device 800 according to aspects of the present disclosure. The example shown includes computing device 800, processor(s) 805, memory subsystem 810, communication interface 815, I/O interface 820, user interface component(s), and channel 830.

In some embodiments, computing device 800 is an example of, or includes aspects of, vector image generation apparatus 100 of FIG. 1. In some embodiments, computing device 800 includes one or more processors 805 are configured to execute instructions stored in memory subsystem 810 to obtain a 3D model including a plurality of density values corresponding to a plurality of locations in a 3D space, respectively; sample a random subset of the plurality of locations using a probability distribution based on the plurality of density values; and render an image depicting a view of the 3D model based on the random subset of the plurality of locations.

According to some aspects, computing device 800 includes one or more processors 805. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 810 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 815 operates at a boundary between communicating entities (such as computing device 800, one or more user devices, a cloud, and one or more databases) and channel 830 and can record and process communications. In some cases, communication interface 815 is provided to enable a processing system coupled to a transceiver (e.g., a transmitter and/or a receiver). In some examples, the transceiver is configured to transmit (or send) and receive signals for a communications device via an antenna.

According to some aspects, I/O interface 820 is controlled by an I/O controller to manage input and output signals for computing device 800. In some cases, I/O interface 820 manages peripherals not integrated into computing device 800. In some cases, I/O interface 820 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 820 or via hardware components controlled by the I/O controller.

According to some aspects, user interface component(s) 825 enable a user to interact with computing device 800. In some cases, user interface component(s) 825 include an audio device, such as an external speaker system, an external display device such as a display screen, an input device (e.g., a remote control device interfaced with a user interface directly or through the I/O controller), or a combination thereof. In some cases, user interface component(s) 825 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media.

For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a 3D model including a plurality of density values corresponding to a plurality of locations in a 3D space, respectively;

computing an opacity of a ray, W, based on the plurality of density values;

computing a radiance value by selecting a random number in the interval [0, W] based on computing the opacity of the ray, identifying a location on the ray corresponding to the random number based on the density values, and querying the 3D model at the location on the ray; and rendering an image depicting a view of the 3D model based on the radiance value.

2. The method of claim 1, wherein rendering the image further comprises:

selecting a camera position for the image, wherein the image depicts a view of the 3D model from the camera position.

3. The method of claim 2, wherein rendering the image further comprises:

computing a ray through the 3D model from the camera position.

4. The method of claim 1, wherein rendering the further image comprises:

identifying color information for the location, wherein the image is rendered based on the color information.

5. The method of claim 4, wherein rendering the further image comprises:

combining the color information for the location to obtain a pixel color for a pixel of the image, wherein the image is rendered based on the pixel color.

6. The method of claim 1, wherein:

the opacity is computed without storing the plurality of density values in an array.

7. The method of claim 1, further comprising:

filtering the plurality of locations based on the plurality of density values to obtain a plurality of filtered locations, wherein the location is identified from the plurality of filtered locations.

8. The method of claim 1, further comprising:

performing a ray marching operation based on the location, wherein the image is rendered based on the ray marching operation.

9. The method of claim 1, wherein:

the 3D model comprises a Neural Radiance Field (NeRF) model.

10. The method of claim 1, wherein:

the plurality of density values are represented as a discretized density grid.

11. The method of claim 1, wherein:

the plurality of density values are represented as a plurality of factorized component tensors.

12. A non-transitory computer-readable medium storing code, the code comprising instructions executable by a processor to:

obtain a 3D model including a plurality of density values corresponding to a plurality of locations in a 3D space, respectively;

computing an opacity of a ray, W, based on the plurality of density values;

compute a radiance value by selecting a random number in the interval [0, W] based on computing the opacity of the ray, identifying a location on the ray corresponding to the random number based on the density values, and querying the 3D model at the location on the ray; and render an image depicting a view of the 3D model based on the radiance value.

13. The non-transitory computer-readable medium of claim 12, the code further comprising instructions executable by the processor to:

identify color information for the location, wherein the image is rendered based on the color information.

14. The non-transitory computer-readable medium of claim 12, the code further comprising instructions executable by the processor to:

filter the plurality of locations based on the plurality of density values to obtain a plurality of filtered locations, wherein the random subset is sampled from the plurality of filtered locations.

15. An apparatus comprising:

at least one processor;

at least one memory storing instructions executable by the at least one processor;

a color sampling component configured to:

compute an opacity along a ray, W, passing through a 3D model based on a plurality of density values, wherein the plurality of density values correspond to a plurality of locations in a 3D space, respectively, and compute a radiance value by selecting a random number in the interval [0, W] based on computing the opacity of the ray, identifying a location on the ray corresponding to the random number based on the density values, and querying the 3D model at the location on the ray; and a rendering component configured to render an image depicting a view of a 3D model based on the radiance value.

16. The apparatus of claim 15, wherein the color sampling component is further configured to:

filter the plurality of locations based on the plurality of density values to obtain a plurality of filtered locations, wherein the location is identified from the plurality of filtered locations.

17. The apparatus of claim 15, further comprising:

a density sampling component configured to obtain the plurality of density values.

18. The apparatus of claim 17, wherein:

the density sampling component is further configured to store the plurality of density values as a discretized density grid.

19. The apparatus of claim 15, wherein the rendering component is further configured to:

identify color information for the location, wherein the image is rendered based on the color information.

20. The apparatus of claim 15, wherein the rendering component is further configured to:

combining the color information for the location to obtain a pixel color for a pixel of the image, wherein the image is rendered based on the pixel color.

* * * * *